Oct. 22, 1968   M. KAUFMAN ET AL   3,406,860
MULTIPLE PAN UNIT
Filed Sept. 25, 1967   2 Sheets-Sheet 1
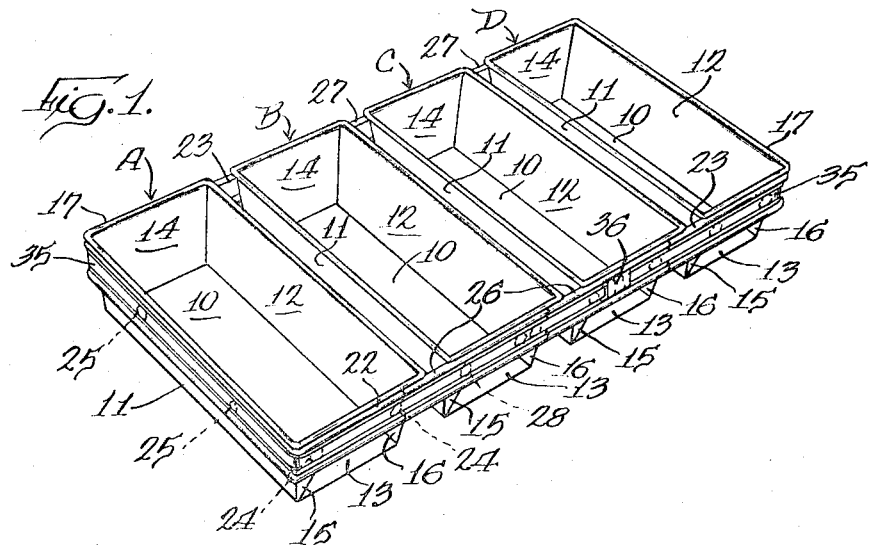
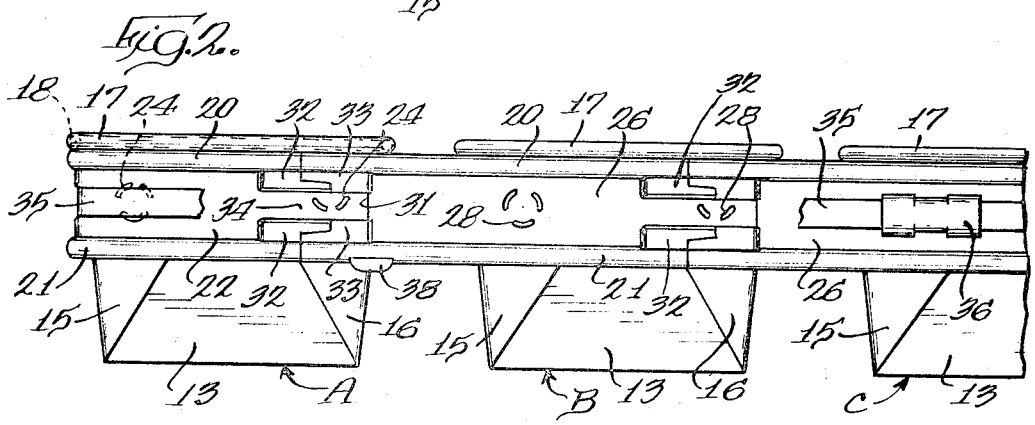
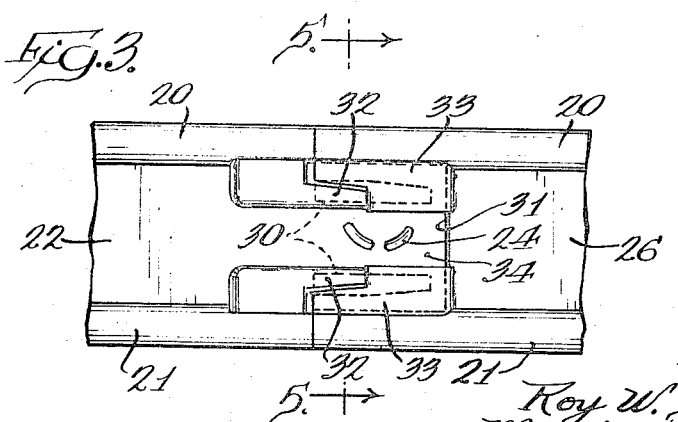
Inventors:
Roy W. Bloch
Morris Kaufman
By
Attys

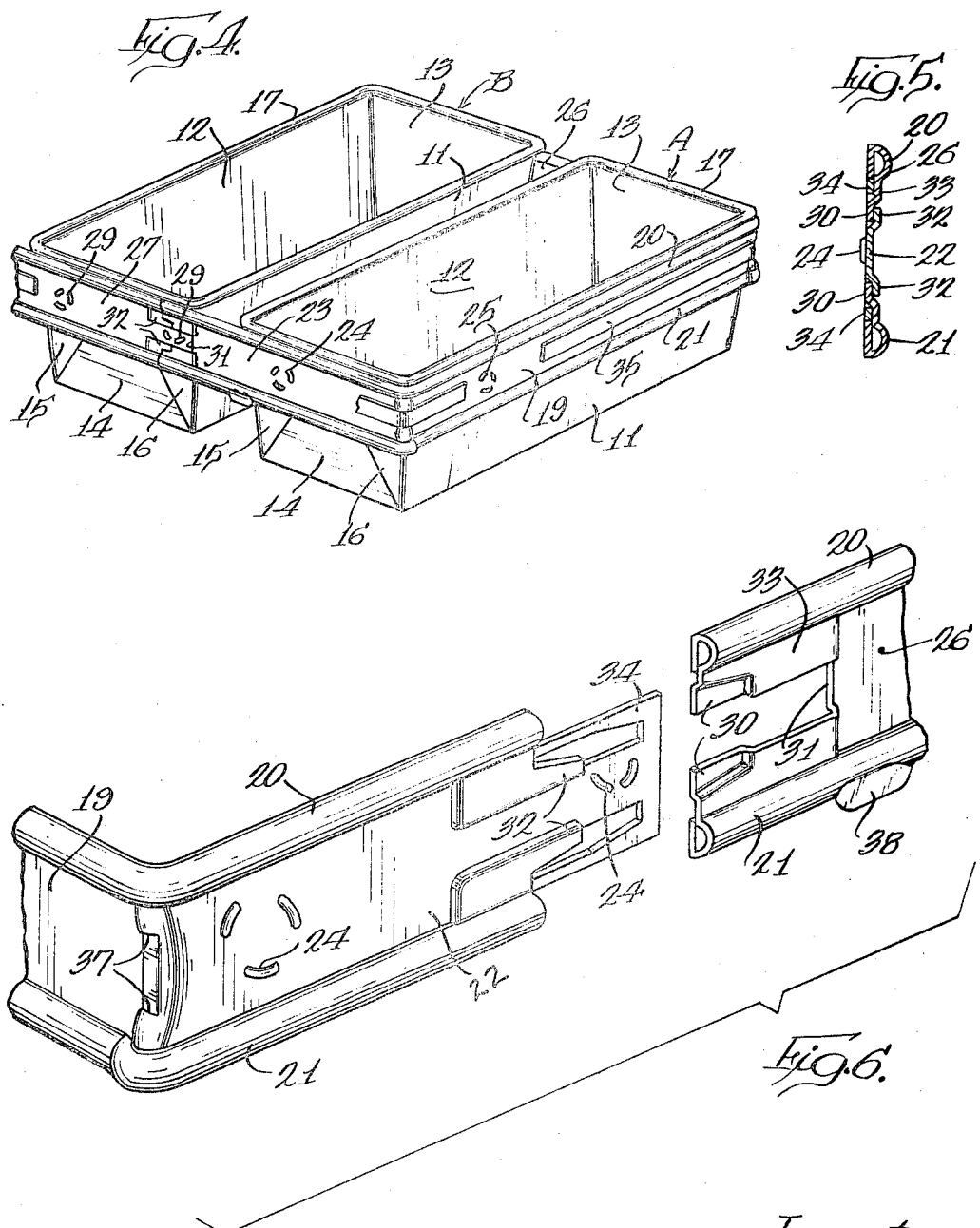

United States Patent Office 3,406,860
Patented Oct. 22, 1968

3,406,860
MULTIPLE PAN UNIT
Morris Kaufman, Morton Grove, and Roy W. Bloch, Northbrook, Ill., assignors to Ekco Products, Inc., Wheeling, Ill., a corporation of Illinois
Filed Sept. 25, 1967, Ser. No. 671,541
10 Claims. (Cl. 220—23.4)

The present invention relates generally to multiple pan units wherein a series of like pans, such as baking pans, are fixedly united into a set for convenience in handling while in service or in storage. More particularly a multiple pan unit in accordance with this invention incorporates novel sectional connecting means by which at least one of the individual pans is so joined in the set as to facilitate its separation from the set to permit substitution of a different pan such as a pan to replace a damaged pan as well as to allow the pans in the set to be reduced or increased in number, if so desired.

It is an object of this invention to provide a set of pans which when assembled form a unit having stability without fear of the pans becoming accidentally disassembled while also utilizing connecting means which allows ready disassembly and reassembly as needed.

Other and further objects relating to details of construction and operation contributing to the above result will be made apparent in the following specification and claims.

In the accompanying drawings:

FIG. 1 is a perspective view of a multiple pan unit incorporating sectional connecting means in accordance with the present invention.

FIG. 2 is an enlarged fragmentary side elevational view of the pan unit shown in FIG. 1 with parts removed to expose certain details of assembly.

FIG. 3 is an enlarged fragmentary view of a pair of meeting end portions of adjacent sections of the connecting means shown in FIG. 2.

FIG. 4 is an enlarged fragmentary perspective view showing the pan unit as it appears when viewed from the upper left-hand corner of the unit shown in FIG. 1.

FIG. 5 is a vertical section taken along line 5—5 of FIG. 3.

FIG. 6 is a fragmentary view in perspective of end portions of a pair of sections of the connecting means while in process of assembly.

A multiple pan unit representing an exemplary embodiment of this invention, as shown in the drawing, includes a series of four pans, A, B, C and D, each having a rectangular bottom wall 10, upright side walls 11 and 12 and upright end walls 13 and 14. In forming the pans, the side walls and end walls are bent up from a flat sheet to develop surplus material at the corners which is taken up in folded sections or laps 15 and 16 which have overlapping engagement with the end walls 13 and 14 of the associated pan. The upper edge portions 17 of each pan is curled around a reinforcing wire 18.

Connecting means establishing a reinforcing framework as well as a sectionalized joinder of the pans in a unitary assembly in accordance with the present invention preferably includes an end bar 19 composed of a metal strip which, as best shown in FIG. 4 has its upper and lower edges 20 and 21 folded back upon itself to form stiffening beads. The end bar 19 is of such shape and dimension as to reach the full length of the outer side wall 11 of the end pan of the unit, as shown in FIG. 1, as well as to provide angular extensions 22 and 23 which overlap the opposite end walls 13 and 14 respectively of said end pan. Welded joints 24 are provided between extension 22 and corner laps 15 and 16 of the pan opposite thereto, and between extension 23 and corner laps 15 and 16 of the pan opposite thereto, and welded joints 25 between the side wall 11 and the end bar 19. The end bar 19 and its extensions 22 and 23 are thus securely fastened to the pan with the upper bead 20 in upward engagement with the curled edge 17 along the upper edge of the pan walls 11, 13 and 14. It will be noted from the drawing that extension 22 extends a distance short of the sidewall 12 so that the end of said extension 22 in the direction of a pan next adjacent to the end pan A occupies a position opposite the corner lap 16 of the end pan. Extension 23, which overlaps end wall 14 of the end pan, spans the full length of end wall 14 as well as the space between the end pan A and the pan B next adjacent said end pan so that the end of said extension 23 occupies a position opposite the nearest corner lap of said next adjacent pan.

Cooperating with said extensions 22 and 23 of the end bar 19 to provide an interconnection between said end pan A and the pan B next adjacent thereto are a pair of like end bars 26 and 27. Welded joints 28 are provided between end bar 26 and the corner laps 15 and 16 of end wall 13 of pan B while a welded joint 29 is provided between end bar 27 and the corner laps 15 and 16 of end wall 14 of pan B. As shown in FIG. 2, end bar 26 has end-to-end relationship with extension 22 of end bar 19 while end bar 27 has end-to-end relationship with extension 23 of end bar 19. A pair of lips 30 are formed along opposite edges of a slot 31 in end bar 26 having an open end facing the end of extension 22 of end bar 19 and a pair of channels 32 are provided in extension 22 in which said lips have sliding fit to define mating joint means between said extension 22 and the end bar 26. It will be observed that the edges of the lips 30 and the walls of the channels 32 facing said lips diverge uniformly in a direction away from the leading portions thereof so as to form a wedging fit as the lips and cooperating channel are moved into fully interengaged position. Similar lips 30 along opposite edges of a similar slot 31 in extension 23 and a pair of channels 32 in end bar 27 likewise provide a mating joint means between extension 23 and end bar 27.

An area of each connector bar adjoining the lips 30 is offset outwardly to define a socket 33 which admits a tenon 34 defined by an area of the mating connector bar in leading relation to the channel 32. Opposite edge portions of the tenon 34 which extend lengthwise of the channels 32 and the walls of the socket 33 facing said edge portions of the tenon have interfitting engagement. Thus each tenon 34 and the socket 33 associated therewith provides additional means for rigidifying the connection established between the lips 30 and the channel 32 containing said lips.

In view of the connecting means thus provided between the pan A and its neighboring pan B, it will be seen that a like end bar 19 with angular extensions 22 and 23 applied to the end pan D of the unit shown in FIG. 1 (except that the side walls 11 and 12, the end walls 13 and 14 and the position of the extensions 22 and 23 are in reverse positions relative to the corresponding walls of end pan A and extensions 22 and 23 of end bar 19 secured to end pan A) are adapted to having mating engagement with like end bars 27 and 26 respectively secured to pan C to form an interconnected pair of pans like pans A and B. It will thus be apparent that the lips 30 of slot 31 in extension 23 of end bar 19 secured to end pan A and the lips 30 of slot 31 in end bars 27 secured to pans B and C and lips 30 of slot 31 in extension 23 of end bar 19 secured to end pan D and lips 30 of slot 31 in end bars 26 secured to pans B and C establish connections at diagonally opposite corners of like parallelograms each having oblique angles and each parallelogram having a pair of opposite sides thereof coincident with lines along which the end walls of said pans are aligned. Likewise the channels 32 in extension 22 of end bar 19 secured to end pan A and the channels 32 in end bars 27 secured to pans B and C and the channel in extension 22 of end bar 19 secured to end pan D and the channels 32 in end bars 26 secured to pans B and C and the channel 32 in extension 22 of end bar 19 secured to end pan D are in corresponding diagonally opposite cornerwise positions relative to like parallelograms each having oblique angles and each of said parallelograms having a pair of opposite sides thereof coincident with lines with which the end walls of the pans are aligned. The sectionalized joinder thus provided by the extensions 22 and 23 of the end bars 19 secured to end pans A and D and the end bars 26 and 27 secured to pans B and C not only is effective to locate the pans in uniformly spaced apart relationship but also permits each pan to be joined to its adjacent pan while in either one of two end-for-end reversed positions.

Having thus obtained a desired assembly of the pans, locking means effective to secure said pans against unintentional withdrawal from said assembly is provided in the form of a flexible band 35 of metal or other suitable material, such for example as a commercially standard steel strapping of .0020 inch thickness and ⅜ inch width, looped about the perimeter of the assembly as defined by the area of the connecting members between the beads 20 and 21 along upper and lower edges of said members. A fastener 36 joins the ends of the band in tightened condition against the surfaces of the connecting members overlapped by said band. Indentations 37 at the corner defined by the junction of the end bar 19 and its extensions 22 and 23 provide shoulders or stops with which opposite edges of the band 35 have engagement to resist displacement from a selected position intermediate the beads 20 and 21. The sockets 33 which admit the tenons 34 of each connector bar provide complementary projections which have straddling engagement with opposite edges of the band and thereby aid in maintaining the band 35 in a fixed position between the beads 20 and 21 of said connector bars. Reference numeral 38 designates lugs formed integrally with the extension 23 of each bar 19 of pans A and D and with end bar 26 of pan B and with end bar 27 of pan C which occupy positions inside pans of a subjacent pan unit for engagement with upper rim portions of said pans of the subjacent unit to prevent relative horizontal shifting movement of the pan units while in nested relation.

With the use of such a band 35 in conjunction with the connecting means secured to the pans, it will be understood that the pan unit may be readily disassembled by severing the strip and disconnecting the end bars when it is desired to either increase or decrease the number of pans or to replace a damaged pan with one that is in good order. In addition the band 35 provides a tension member having a resiliency that allows limited movement between interconnected areas of the connecting means so as to render the multiple pan unit more shock-resistant under impacts encountered while in actual service.

What is claimed is:

1. In a multiple pan unit, the combination of a plurality of pans, each of said pans having a pair of opposed end walls, said end walls of each pan being at a distance apart in common with the distance between the end walls of the other pans, said pans being arranged in a row with the end walls thereof in aligned relation lengthwise of said row, each pan being joined in spaced relation to the next adjacent pan lengthwise of said row by means of a connector attached to each pan, said connector of each pan having releasable interlocking engagement with the connector of the next adjacent pan, and means for securing said connectors against withdrawal from interlocking engagement including a tension member looped about the perimeter of the pan unit as defined by exposed surfaces of the connectors which border the area occupied by said pans of the unit.

2. In a multiple pan unit, the combination of a plurality of pans, each of said pans having a pair of opposed end walls, said end walls of each pan being at a distance apart in common with the distance between the end walls of the other pans, said pans being arranged in a row with the end walls thereof in aligned relation lengthwise of said row, each of said end walls of each pan having a connector bar secured to the outer face thereof and extending lengthwise of said row and each bar having one end portion thereof located within the confines of an area directly opposite the end wall of the pan to which it is secured and its other end portion located within the confines of an area opposite the end wall of the pan next adjacent to the pan to which the bar is secured, interlocking sections defined by said end portions of each of said connector bars which cooperate to detachably join opposite end portions of adjoining bars to maintain said pans in aligned relation and also establish the spacing of said pans at a fixed minimum distance apart, and means for securing said bars against withdrawal from an interlocked relation including a tension member looped about the perimeter of the pan unit as defined by the outwardly facing surfaces of said interlocked connector bars, said tension member being defined by a flexible band having its ends joined by fastening means to securely retain said band against surfaces of the connector bars opposite thereto.

3. In a multiple pan unit according to claim 2, wherein said interlocking sections include a channel formed in one end portion of each connector bar, and a pair of lips formed along edges of a slot provided in the other end portion of each connector bar.

4. In a multiple pan unit according to claim 1, wherein said interlocking engagement is established via a pair of lips formed along edges of a slot provided in an end portion of the connector attached to the end wall of each pan and a channel formed in the nearest end portion of a connector attached to the corresponding end wall of the next adjacent pan.

5. In a multiple pan unit according to claim 1, wherein each connector is defined by a metal strip having opposite edges thereof extending lengthwise of said row folded upon itself to provide stiffening beads along said edges.

6. In a multiple pan unit according to claim 1, wherein folded corner laps occupy positions in overlapping relation to the outer surface of the end wall of each pan, and a welded joint between said corner laps and a portion of the connector facing said laps establishes the attachment of each connector with the pan associated therewith.

7. In a multiple pan unit according to claim 1, wherein said interlocking sections include a channel formed in one end portion of each connector, a pair of lips formed along edges of a slot provided in the other end portion of each connector, each of said bars having an area adjoining said lips which is offset outwardly to define a socket, and a tenon forming a continuation of the other end portion of each connector of such size and shape as to establish interfitting engagement between the socket of a connector attached to the end wall of a selected pan and the tenon of a connector attached to the corresponding end wall of a next adjacent pan.

8. In a multiple pan unit according to claim 1, wherein interlocking engagement between said connectors as applied to a pair of adjacent pans is established at locations corresponding to corners of like parallelograms in side-by-side relation, each of such parallelograms having oblique angles and each angle having one side thereof coincident with a line along which an end wall of one of said pans and the corresponding end wall of the other pan are aligned.

9. In a multiple pan unit according to claim 1, wherein areas of said connector defining the corners of the pan unit are indented to provide stops with which opposite edges of said tension member have engagement to resist displacement of said member from a selected position between opposite longitudinal edges of said connectors.

10. In a multiple pan unit according to claim 1, wherein areas of said connectors are offset outwardly at the junction of said each pair of interengaged connectors which offset areas define shoulders having straddling engagement with said tension member.

References Cited

UNITED STATES PATENTS

| | | | |
|---|---|---|---|
| 1,521,289 | 12/1924 | Guttman | 220—23.4 |
| 2,139,999 | 12/1938 | Cotts | 220—23.2 |
| 2,407,021 | 9/1946 | Langel | 220—23.4 |

THERON E. CONDON, *Primary Examiner.*

G. E. LOWRANCE, *Assistant Examiner.*